(No Model.)
J. A. STEVENSON.
WATER HEATER.
No. 604,131. Patented May 17, 1898.
2 Sheets—Sheet 1.
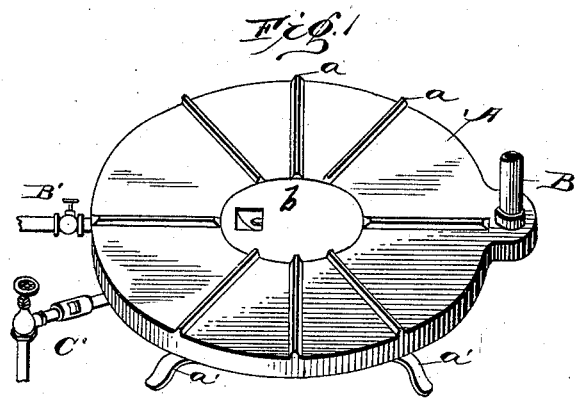
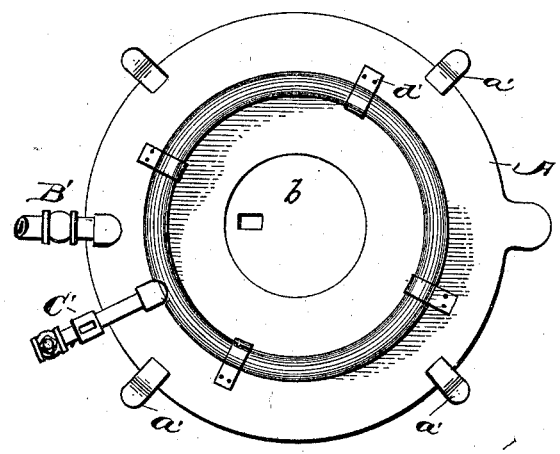
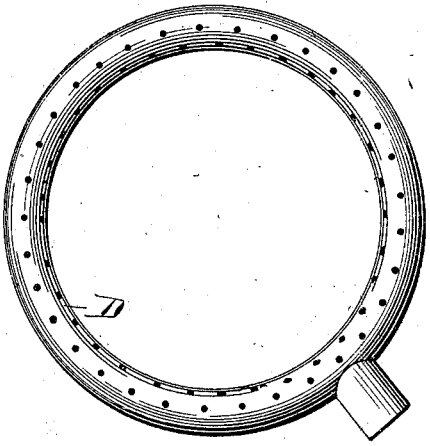
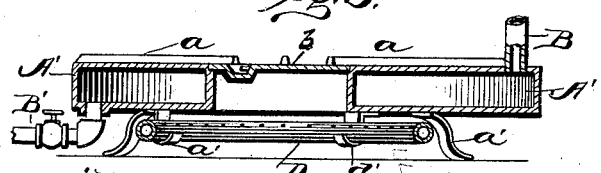
Witnesses:
J. M. Fowler Jr.
Joseph N. Bull
Inventor
James A. Stevenson
by Edwin Cruse
Asso: Attorney.

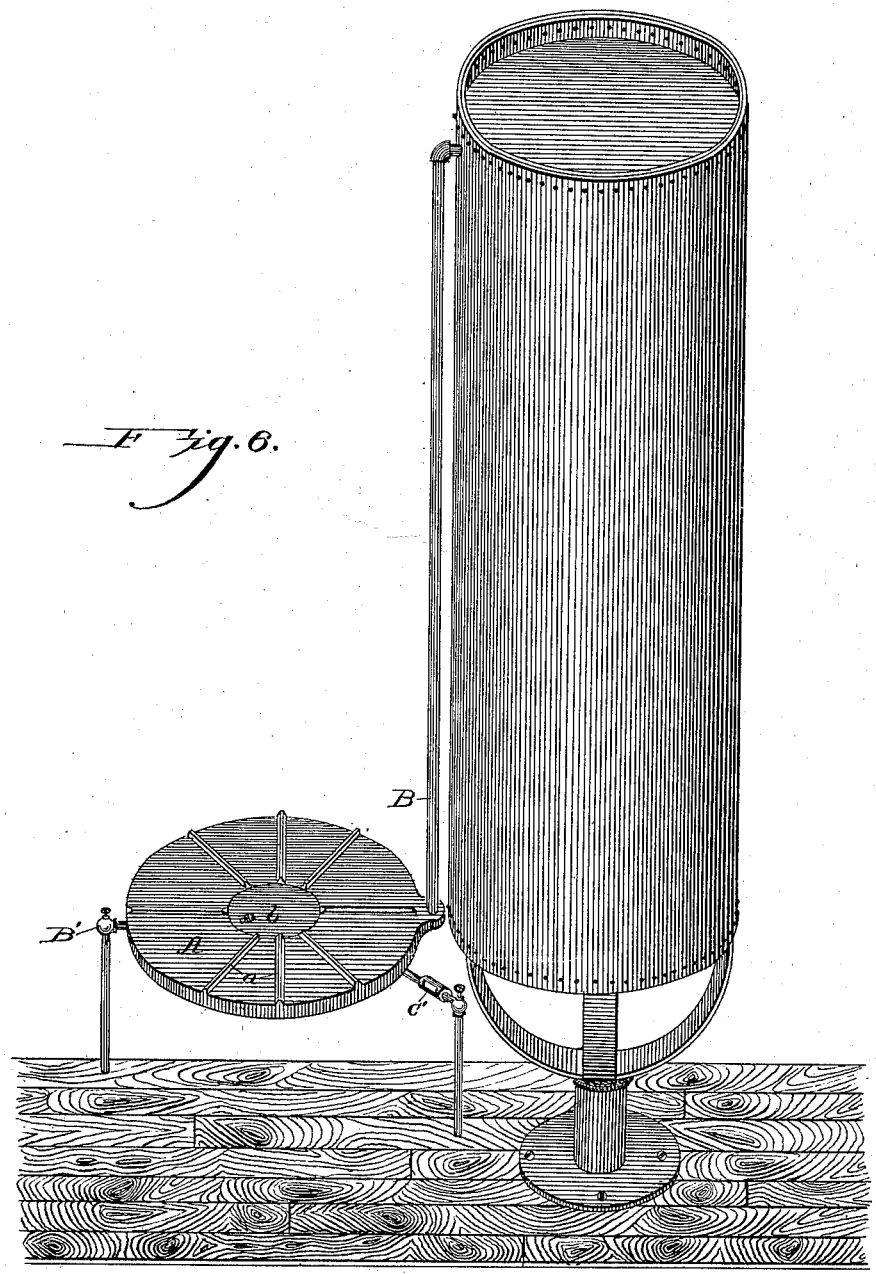

UNITED STATES PATENT OFFICE.

JAMES A. STEVENSON, OF NEW CASTLE, PENNSYLVANIA.

WATER-HEATER.

SPECIFICATION forming part of Letters Patent No. 604,131, dated May 17, 1898.

Application filed December 8, 1897. Serial No. 661,178. (No model.)

*To all whom it may concern:*

Be it known that I, JAMES A. STEVENSON, a citizen of the United States, residing at New Castle, in the county of Lawrence and State of Pennsylvania, have invented certain new and useful Improvements in Water-Heaters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is a water-heater constructed in connection with a gas and water system such as are used in cities and towns, and its nature and construction are as hereinafter described.

In the accompanying drawings, Figure 1 is a perspective view of my water-heater, showing inlet and outlet pipes. Fig. 2 is a bottom view of the heater. Fig. 3 is a cross-sectional view of Fig. 1. Fig. 4 is a view of the gas-burner, and Fig. 5 is a top view of the lid used to cover the central opening in the heater, while Fig. 6 in Sheet 2 is a perspective view of my heater in connection with a tank, connecting-pipes, &c.

A represents the body of the water-heater, which is hollow to form a water-chamber A'. (Seen in Fig. 3.) This water-chamber may be made of any desired size in depth or circumference, and within this chamber A' water is admitted through an inflow-pipe B', connected with a water-pipe, the water being under pressure. The pipe B is the outflow-pipe to convey the heated water to the boiler or tank. (See Fig. 6.) The heater A has a central opening having a lid $b$.

$a\ a$ are radial ribs on the upper surface of the heater and are useful to hold a vessel above the plane of the heater, so that the flame from below will by natural draft be made to pass up through this central opening in the heater and then pass out and between the ribs $a$. Thus being used, a vessel over this central opening may be heated, as may be done over any other gas-flame.

$a'\ a'$ are feet secured to the heater to elevate it to a proper height with reference to a table, stand, or shelf, whereon the heater may be placed. These feet $a'$ are not essential to my invention, but may be used.

$b$ is the lid, covering the central opening in the heater A.

C is a gas-mixer in connection with a gas-pipe to furnish gas to the burner D. This burner D will be supported below the under side of the heater by any suitable means and outside the plane of the vertical opening therein. This burner is of ordinary construction, provided with gas-outlets $d\ d$ to properly distribute the gas to the place of combustion. I show the burner supported by hooks $d'\ d'$, secured to the under side of the heater; but this may not be needed, as the burner when rigidly fixed to the gas-pipe will be held in place without such hooks. I may also add that when the heater is rigidly fixed to the inflow and outflow pipes it will not be necessary to have a stand or other thing on which to set the same, as may be seen in Fig. 6, Sheet 2.

I have found by actual use of my water-heater that by using such a heater but little gas is needed to keep the water at a proper temperature in the tank or boiler, as by confining the flame below the upper surface of the heater the maximum of heat is obtained.

While my device is intended, primarily, as a water-heater, it will be seen that it may also be useful for other purposes of a culinary or household nature—as, for instance, if it is desired to cook something in a pan or pot this can easily be done by removing the lid $b$ and placing the vessel over the opening, as the flame will then pass up through on taking the lid off.

Having thus described my invention, what I claim, and desire to secure by Letters Patent of the United States, is—

In a water-heater, the combination with a hollow body forming a water-chamber and having water inlet and outlet passages, said body having a vertical opening around which the chamber extends, of a gas-burner supported below the hollow body with its discharge-openings outside the plane of said opening, and a removable cover to close the opening, whereby the flame from the burner may be confined below the upper surface of the hollow body, or permitted to pass up through the opening, substantially as and for the purpose specified.

In testimony whereof I affix my signature in presence of two witnesses.

JAMES A. STEVENSON.

Witnesses:
ERRETT E. PHILLIPS,
EDWIN S. STEVENSON.